US007083659B1

(12) United States Patent

Joyce et al.

(10) Patent No.: US 7,083,659 B1

(45) Date of Patent: Aug. 1, 2006

(54) COMBINED LIGHT SOURCE AND AIR PURIFIER

(76) Inventors: Glenda Joyce, 100 Wilsons Road, Doncaster, Victoria (AU) 3108; Steven John Joyce, 100 Wilsons Road, Doncaster, Vic (AU) 3108; Brett Alan Saraghi, 737 Nicholson Street, Carlton North, Vic (AU) 3054; Jeremy Wynne-Jones, 15 Liverpool Street, North Fitzroy, Vic (AU) 3065

( * ) Notice: Subject to any disclaimer, the term of this patent is extended or adjusted under 35 U.S.C. 154(b) by 0 days.

(21) Appl. No.: 09/380,189

(22) PCT Filed: Feb. 26, 1998

(86) PCT No.: PCT/AU98/00127

§ 371 (c)(1), (2), (4) Date: Nov. 20, 2002

(87) PCT Pub. No.: WO98/38458

PCT Pub. Date: Sep. 3, 1998

(30) Foreign Application Priority Data

Feb. 26, 1997 (AU) .................................... PO5323

(51) Int. Cl.
*B01D 35/30* (2006.01)

(52) U.S. Cl. .......................... 55/385.1; 55/471; 55/486

(58) Field of Classification Search ............... 55/385.1, 55/467, 471, 486
See application file for complete search history.

(56) References Cited

U.S. PATENT DOCUMENTS

| | | | | |
|---|---|---|---|---|
| 2,082,441 A * | 6/1937 | Child | .......................... | 62/150 |
| 4,849,862 A * | 7/1989 | Diskin et al. | ................. | 362/96 |
| 6,244,720 B1 * | 6/2001 | Neff | ............................ | 362/96 |

* cited by examiner

*Primary Examiner*—Robert A. Hopkins
(74) *Attorney, Agent, or Firm*—Law Offices of John Chupa & Associates, P.C.

(57) ABSTRACT

The combined light source and air purifier unit includes a body (11) and a centrifugal fan (12) with rearwardly facing blades (20) run at low speed and mounted by the body with its axis upright and a central intake (17) through which air containing contaminants is drawn from a target zone (80) below the unit. A light source (14) mounted within a peripheral projecting skirt (75) is located radially outside the intake (17) of the centrifugal fan (12) so as not to obstruct the flow of intake air. A filter (13) extends circumferentially around the fan (12) and an air discharge (60) includes a smoothly curved flow deflecting means (62) provided by the body (11) to deflect air flowing outwardly from the fan in an upwards direction at about 45° or less to the vertical.

13 Claims, 3 Drawing Sheets

COMBINED LIGHT SOURCE AND AIR PURIFIER

Figure 1:
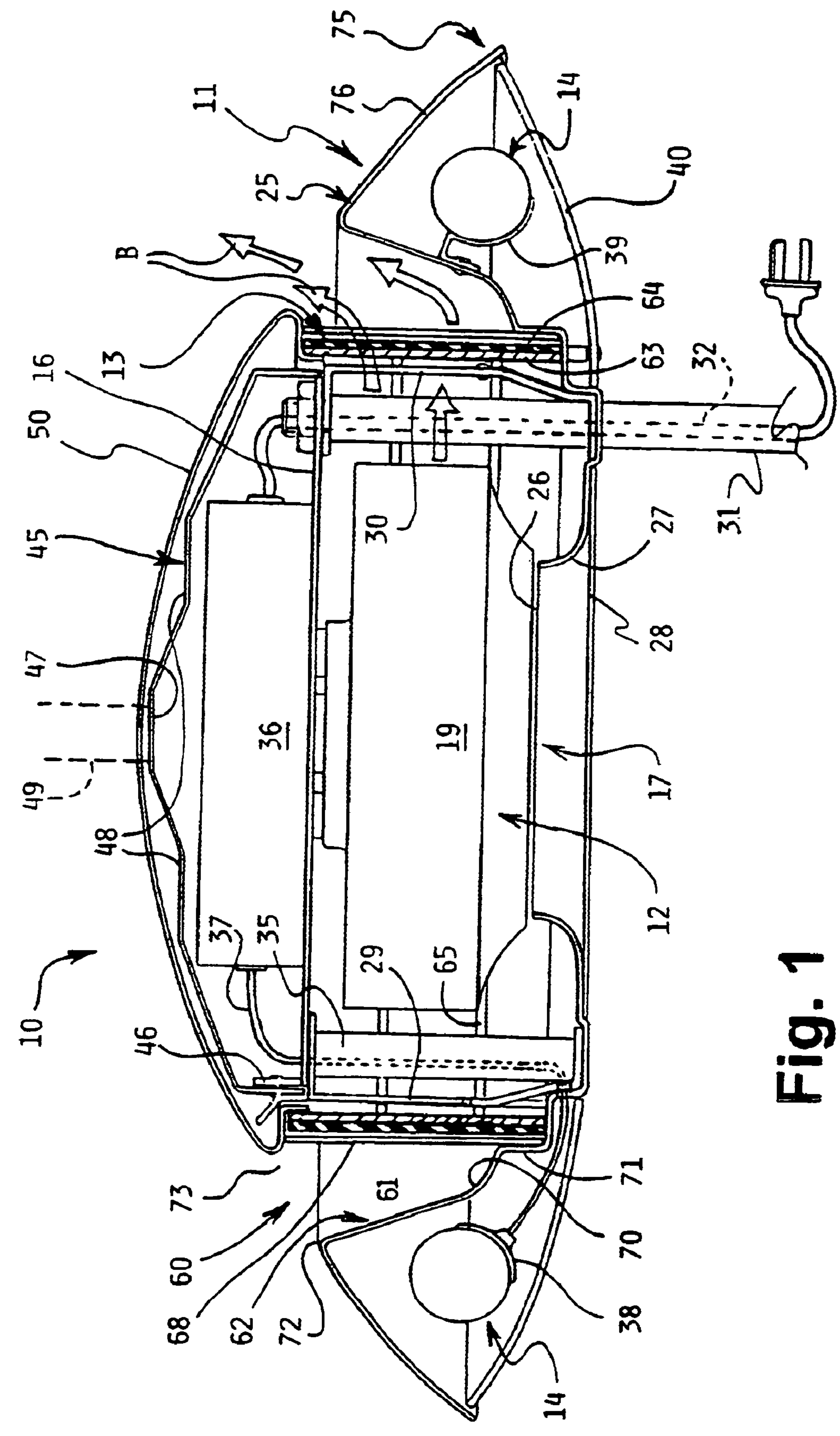

This invention relates to combined light source and air purifier units.

There have been many attempts in the past to develop a successful unit which combines a light source and an air purifier, e.g. for use in proximity to a person smoking so that the smoke is drawn through the unit and purified before being discharged back into the room. The incorporation of the light source makes the unit more useful and commercially acceptable by enabling the air purifier function to be provided in situations where a conventional light source is presently used. Our own patent specification No. AU 56382/94 outlines more background on the uses of combined light source/air purifier units.

A number of combined light source/air purifier units have been developed or proposed in the past, such units using an axial fan to draw the air into the unit for purification. For example, specification No. AU 56382/94 in the name of the present applicants discloses a unit having an axial fan which is located within a downwardly facing cowling. The fan draws air from the room into the cowling and through a filter located below the fan so that the filter removes suspended particles. The fan discharges the cleaned air through upper apertures or exits provided in the cowling. A light source is also located in the cowling but is located in a position so as not to obstruct the flow of the air into the filter.

The use of an axial fan in such units is an obvious choice since it is known that axial fans are relatively quiet and this is highly desirable if not absolutely essential in a unit for domestic or commercial uses (e.g. in restaurants, hotel foyers, etc). However, our own combined light source and air purifier described in AU 56382/94, although quiet in operation and effective to remove suspended particles, has been found to have a relatively modest sized surrounding area from which air is drawn through the unit. This can be quite effective and sufficient if the unit is located in relatively close proximity and above, for example, a stationary smoker, such as a seated smoker. This known unit can also be eminently suitable for continuous operation to purify air in a space, e.g. to remove airborne allergens in a domestic or commercial premises where high concentrations are not expected and a source continuously generating or introducing particles is not present.

Another example of a combined light source and air purifier using an axial fan is shown in Japanese patent specification 63294920-A. A filtering or air purifying apparatus not incorporating a light source but which uses an axial fan is shown in U.S. Pat. No. 5,185,015. Both of these documents disclose units which, like our own earlier patent specification, draw air upwardly through filtering media and discharge the filtered air through the top of the unit.

Centrifugal fans are known to be able to create greater suction or greater downstream air pressures but centrifugal fans are well known to be generally significantly noisier than axial fans. Nevertheless, there have been proposals to utilise centrifugal fans in combined light source/air purifier units.

For example, in U.S. Pat. No. 4,849,862 there is disclosed a combined light source/air purifier unit provided within a housing. Air is drawn upwardly into a centrifugal fan having its rotation axis vertical and having forwardly facing fan blades. The forwardly facing blades are chosen because of the known quieter operation of centrifugal fans with forwardly facing blades (compared to centrifugal fans with straight radial blades or with rearwardly facing blades). However, the forwardly facing fans produce lower pressures than other centrifugal fans so that in U.S. Pat. No. 4,849,862 the filter elements must have a large surface area and this results in the filter being spaced a substantial distance radially out from the fan, with the consequence that a large filter and a large housing are required. The exhaust or discharge outlets are located circumferentially around the centrifugal fan rotor and the filtered air is directed radially, i.e. horizontally, away from the housing.

An obviously desirable feature of a combined light source/air purifier unit is effectiveness in extracting contaminated air from the surrounding space and filtering the impurities therefrom. One effect which we have determined limits the efficiency of contaminated air extraction is an effect which we have called “short circuiting”. This effect is the recirculation of discharged purified air back from the outlet directly to the contaminated air inlet. In fact the short circuiting effect was discussed in our own earlier patent specification AU 56382/94. As a result of a large number of experiments with many functionally unsuccessful, successful and partially successful configurations of light source/air purifier units, including retrospective analysis of the unit of the present invention, we believe that the primary feature of an air purifier unit which will suffer from the performance limiting characteristic of short circuiting is close proximity of the discharge outlet to the inlet. As a result of our analysis and experience, we believe that the unit shown in U.S. Pat. No. 4,849,862 will suffer from substantial short circuiting, i.e. air being discharged through the outlet, particularly towards the bottom edge of the outlet, will be drawn down and back into the air intake of the unit, particularly the air intake path which travels radially inwardly over the light sources.

Another prior combined light source and air purifier unit is disclosed in patent specification AU-11256/88. This specification discloses an assembly comprising a combined lamp and air filter mounted in a housing, the assembly being fitted into a conventional lamp socket. A straight radial bladed centrifugal fan is located above the lamp and this draws air past the lamp and propels it radially outwardly through a circumferential filter so that the purified air is discharged back into the room generally laterally out of the upper circumference of the housing.

Although AU-11256/88 does not contain technical specifications or data, the unit is believed to suffer from a number of disadvantages. Firstly, although the air intake in the bottom of the housing is located a moderate distance from the outlet, the location of the filter elements immediately behind the exhaust outlet holes, means that air will emerge laterally from the outlet holes without a highly directional flow. In fact, some of the emerging air is illustrated in the drawing as being flowing in a downwards direction. A significant proportion of purified air is likely to be drawn downwardly towards the air intake where a low pressure zone is being created by the suction of the fan so that the resulting short circuiting effect reduces the effectiveness of filtration of air in the room. Secondly, it is reasonable to presume that the fan will be run at normal manufacturer’s rated speeds for efficient air moving effect. This is likely to make this unit relatively noisy.

Furthermore, the efficiency of extraction of air from the room and efficiency of filtering will be significantly impeded by the location of the light source in the centre of the intake zone of the centrifugal fan. Because of this configuration, in order to achieve a predetermined air flow, the unit in AU-11256/88 would need a fan larger than one rated to draw that specified flow. Alternatively, the fan would need to be run at a faster speed. These compensations for the performance limiting effects of the configuration will lead to a noisier unit and/or running the fan beyond its rated specifications.

GB-2116693 discloses another unit using a centrifugal fan. This unit draws air through a housing past a lamp and through a filter. The fan expels air through the top with a substantial component radial flow. This unit has an obstructed flow path to the filter which will result in inefficient draw of air from the room into the unit. The eccentric placement of the filter relative to the axis of the centrifugal fan rotor means that some of the filter surface area is significantly displaced laterally from the area where the rotor is drawing air axially into the zone around the motor, leading to inefficient use of the filter. The overall configuration would be extremely inefficient in drawing contaminated air, such as from a nearby smoker, and indicates that the unit is intended for filtering room air at a slow rate, e.g. to remove airborne allergens, and not to have a vigorous or aggressive draw of contaminated air from a source in the general proximity of the unit.

U.S. Pat. No. 5,422,795 discloses a unit using a centrifugal fan to draw air in through a filter surrounding a central lamp. The fan blows the filtered air out radially generally horizontally. As with other prior units, the light source obstructs a significant area of the fan intake, reducing the potentially available filtering capacity. Also, using a centrifugal fan to draw air first through the filter before entering the fan can substantially limit the available surface area of filter material. Also with this unit, the generally horizontal discharge is likely to produce a significant component of discharged air flowing downwardly so as to be drawn into the air flow created by the reduced pressure zone within the downwardly opening cowling, i.e. there will be significant short circuiting.

It is an object of the present invention to provide a combined light source and air purifier unit which can be effective to draw room air from a substantial sized area or target zone, particularly to encompass a source of airborne contaminants, and achieve this while generating an acceptable level of noise.

It is a further and preferred object to provide a combined light source and air purifier unit which is relatively efficient in extracting room air and purifying it, particularly without significant short circuiting involving discharged air being drawn back into the intake.

It is a further and preferred object to provide a combined light source and air purifier unit which is relatively efficient in extracting room air and purifying it, particularly by minimising bypassing of the unit as a result of discharged purified air creating a draft which draws air from the target zone from which air is desirably drawn into the unit.

It is a further and preferred object to provide a combined light source and air purifier unit which can be constructed to enable ready servicing, particularly replacement of filters.

It is a further and preferred object to provide a combined lamp light source and air purifier unit which is constructed to readily enable the unit to be used as a desk lamp, a standard lamp, or as a pendant light fitting.

According to the present invention, there is provided a combined light source and air purifier unit including:

a body, a centrifugal fan mounted by the body and having an axis which is upright, the centrifugal fan having a central intake through which air containing contaminants can be drawn from below the unit from a target zone directly below the intake and extending outwardly by a substantial distance;

a light source mounted by the body, the light source being located radially outside the intake of the centrifugal fan so as not to obstruct the flow of air being drawn in use into the intake;

a filter extending circumferentially so that air passing through the fan and being propelled away by the fan passes through the filter so that contaminants are removed by the filter;

and an air discharge including a discharge path for air being propelled by the fan, the discharge including flow deflecting means provided by the body to deflect air flowing outwardly from the fan in an upwards direction.

The combination of a centrifugal fan with an unobstructed downwardly facing intake, a circumferential filter through which air propelled by the fan passes, and a discharge which includes flow deflecting means to deflect the air upwardly provides a surprisingly effective configuration enabling effective draw from a substantial sized target zone, particularly without the performance degrading characteristics of short circuiting and bypass effects, while maintaining adequate air purification and acceptably quiet operation.

In the preferred embodiment, the centrifugal fan is provided with an impeller having rearward facing blades, i.e. blades which have their outer edges trailing behind their inner edges as the impeller rotates. Although centrifugal fans with rearward facing blades are known to be capable of achieving good draw and are effective to force air against a resistance downstream, such motors to achieve these effects are designed and intended to run at medium to high speeds, e.g. 1800–3000 rpm. However, such fans run at these speeds tend to be relatively noisy which can be unacceptable in this particular use. However, preferably the unit of the present invention is constructed and operated to run the impeller at low speed, e.g. in the range 1200–1600 rpm, and preferably at about 1400 to 1500 rpm. A centrifugal fan with rearward facing blades operated at such speeds, although being operated substantially below its design rated speed and capacity for effective air movement has been surprisingly found to develop sufficient pressure to enable effective draw from the large target zone while achieving acceptably quiet operation. For example, a test centrifugal fan (type R2E190AE manufactured by EBM Elektrobau Mulfingen GmbH & Co, Mulfingen, Germany) generates noise of about 51 dba at 1440 rpm, 57.9 dba at 1850 rpm and 63.5 dba at 2395 rpm. When mounted in the body and operated at 1440 rpm, the test unit according to the preferred embodiment of the invention using this motor generated 47 dba—an acceptable noise level.

The preferred embodiment of the unit includes a filter which is generally cylindrical and which surrounds the centrifugal fan so that air impelled radially outwardly by the fan passes through the filter material and then into the discharge path including the flow deflecting means provided by the body. The filter material may comprise, for example, two types of filter material, one to separate particulate materials and the other to deodorise. For example, the first cylindrical filter element encountered by the air may be a 90 pascal gel or oil coated polyester filter medium such as one operative or rated to filter particles down to about 0.1 microns. The second filter element may comprise a 4 mm thick activated carbon impregnated filter medium which can deodorise the air.

The air discharged from the unit is preferably directed upwardly at an angle of 45° less to the vertical. The discharge from the unit preferably includes a discharge opening which, as mentioned above, is preferably downstream of the filter. The area of the discharge opening preferably has an area about equal to and possibly significantly greater than the area of the intake of the centrifugal fan. By discharging the air through a discharge opening having an approximately equal or a greater area than the intake, the velocity of the discharged air will not be significantly greater and may be lower than the velocity of air entering the intake with the result that the discharge air stream does not have a significant drawing effect. By minimising or reducing the drawing effect of the flow of discharged air, the bypass effect (where air can be drawn towards the discharge air stream from the surrounding room, particularly air from the intended target zone) which downgrades the effectiveness of the unit can be eliminated or minimised. In the preferred embodiment, the discharge opening comprises a generally annular upwardly facing opening provided in the body, the flow deflecting means provided by the body comprising a passage into which air expelled by the centrifugal fan and which has passed through the filter enters, the passage having walls bending in an upwards direction to deflect the air upwardly through the opening. Preferably the passage is defined by a section of the body circumferentially surrounding the fan and the passage provides throughout its circumference a smoothly curved surface which commences at and extends radially out from the centrifugal fan then curves smoothly upwardly to the discharge opening.

Also in the preferred embodiment, the body has a peripheral extension projecting radially beyond the discharge so as to increase the distance that air being discharged would need to flow from the outlet in order to reach the intake of the fan. The inventors' investigations and experiments have led to the finding that separating the outlet by as much distance as possible from the intake reduces the performance degrading short circuiting effect so that the peripheral extension is a preferred feature of the unit according to the present invention. The peripheral extension also provides, however, an available space where the light source can be located so as not to obstruct air flow into the intake.

Figure 2:
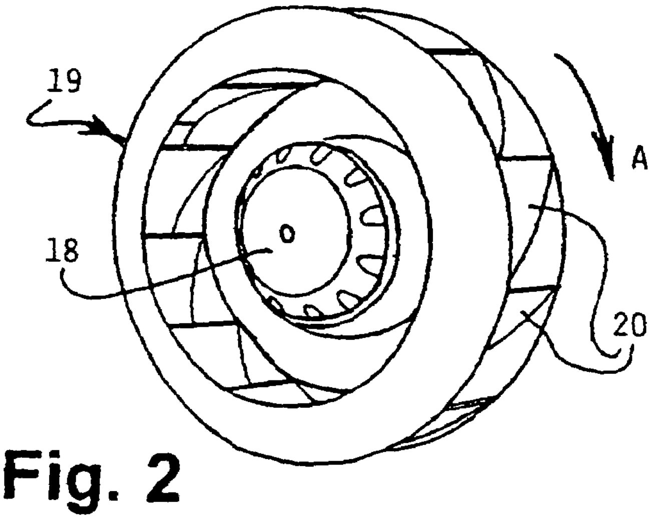
Figure 3:
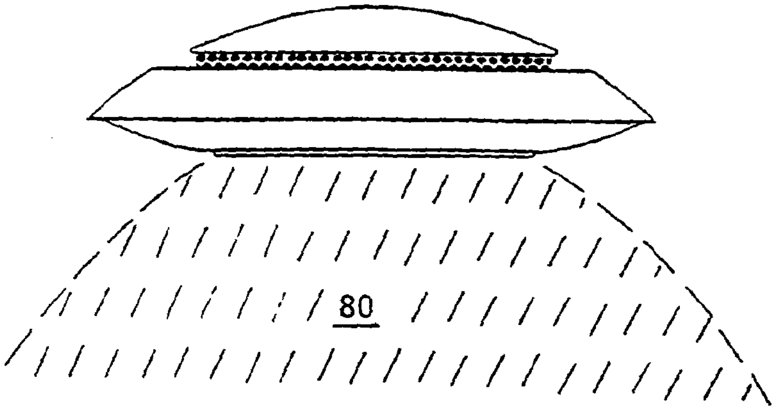
Figure 4:
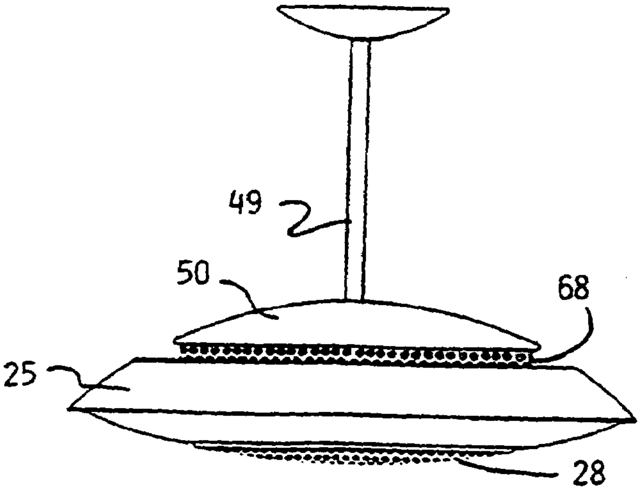
Figure 5:
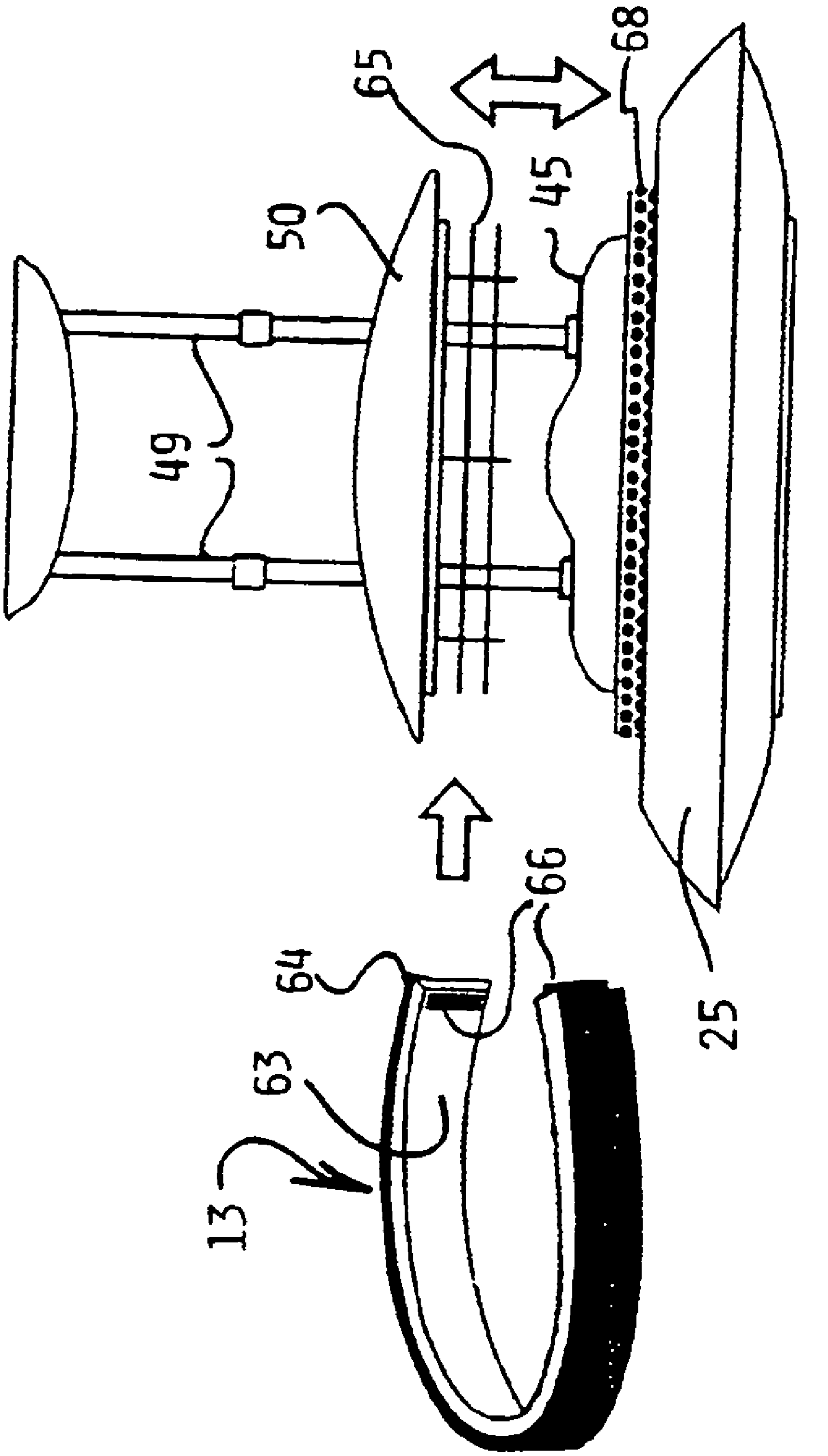

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 is a vertical sectional view through a combined light source/air purifier unit according to a preferred embodiment of the present invention, FIG. 2 is a perspective view of a centrifugal fan impeller for use in the unit of FIG. 1, FIG. 3 is a side view of the unit shown in FIG. 1, FIG. 4 is a side view of one possible pendant mounting for the unit, and FIG. 5 shows a different type of mounting arrangement for a pendant unit and illustrating how the filter can be replaceable.

The combined light source and air purifier unit 10 illustrated in the drawings includes a body 11, a centrifugal fan 12, a filter 13 and a light source 14. The body 11 mounts the centrifugal fan 12 by means of mounting plate 16 so that the axis of the fan 12 is upright and the intake 17 is centrally located and faces downwardly. The particular configuration of fan 12 illustrated in FIGS. 1 and 2 includes a central motor 18 which is mounted to the underside of the mounting plate 16 and an impeller 19 which has rearward facing blades 20 relative to the direction of rotation A shown in FIG. 2. The rearward facing blades are the preferred configuration of blades for the centrifugal fan since such a configuration enables the development of considerable force to draw the contaminated air through the intake 17 and force it through the filter 13 downstream of the fan 12. However the fan impeller 19 is preferably driven at relatively low speed, in the range 1200 to 1600 rpm and preferably at about 1400–1500 rpm to achieve acceptably quiet operation.

The body 11 includes a lower body section 25 which is provided with a central opening 26 defined by a smoothly profiled mouth 27 formed in the lower body section 25. The mouth 27 is smoothly curved to provide laminar flow of air being drawn into the fan 12 and to minimise the generation of noise at the intake 17. The mouth 27 terminates in the opening 26 which is closely adjacent to the central intake mouth of the impeller 19. Extending across the lowermost part of the mouth 27 is a grill 28 or other suitable cover, the grill 28 being provided for aesthetic and safety reasons. The grill 28 may be perforated metal, expanded metal mesh, cloth or other suitable porous material. The grill 28 is preferably open in structure so that there is very little obstruction to inflow provided by the grill. For example, grill 28 preferably has a minimum void of about 65% or higher, i.e. the open or void area is about 65% of the total surface area or greater. Our successful prototype uses 68% void area. The grill 28 in FIG. 1 is flat, but may be dome shaped as shown in FIG. 4.

The lower body section 25 is mounted to the mounting plate 16 by means of spacer brackets 29, 30, a number of which are provided around the periphery of the mounting plate 16, e.g. four provided at 90° angular separations, or three at 120° angular separations. The spacer brackets 29, 30 mount the lower body section 25 at the required separation from the mounting plate 16 and concentrically therewith. As shown in FIG. 1, a support post 31 for the unit 10 can pass upwardly through the lower body section 25, through aligned holes provided in the top and bottom flanges provided by the spacer bracket 30, and through the mounting plate 16. Power supply lead 32 passes up through the post 31 and exits out of the top of the post 31 above the plate 16. The unit 10 may be mounted by two support posts 31 for use as a standard lamp or desk lamp. However, FIG. 1 shows only a single support post 31 and there can be sufficient rigidity in the unit 10 to enable it to be supported in cantilever fashion.

The spacer bracket 39 on the left hand side of the unit shown in FIG. 1 does not have a support post 31 therethrough but instead has a tubular member or sleeve 35 between the top and bottom flanges. The sleeve 35 not only acts as a spacer in conjunction with the spacer bracket 29 but also serves to carry the electrical wires 37 to the light source 14. In particular, mounted to the top of the mounting plate 16 is an electrical component casing 36 containing for example a ballast or starter for the light source 14. Power supply lead 32 passes into the casing 36 and wires 37 pass out of the casing 36 through the plate 16 and bracket 29 and into the sleeve 35. At the bottom end of the sleeve 35, the wires 37 pass laterally out into electrical connector 38 for the light source 14. The light source 14 may be a circular fluorescent tube supported in the lower body section 25, e.g. by mounting brackets 39. The light source 14 in the lower body section 25 is spaced radially outwardly from the fan intake 17. This means that the light source provides no obstruction to the air being drawn into the unit through the intake 17. A removable translucent cover 40 is provided around the underside of the lower body section 25 to enclose the light source 14.

Also mounted to the mounting plate 16 is a top mounting member 45 which is mounted at the periphery of the mounting plate 16, e.g. by lugs 46, and which extends across the top of the casing 36. In the top centre of the member 45 is a plateau 47 where a single support rod 49 can be mounted so as to extend upwardly to a ceiling so that the unit 10 can be mounted as a pendant light fitting and air purifier. Instead of a single rod 49 mounted centrally to plateau 47, two or more rods can be mounted to steps 48 also provided by the top mounting member 45. In a pendant unit, the power supply wire 32 for the electrical components can pass downwardly through the support rod 49 and into the casing 36. The illustrated unit also includes an upper body section 50 which has a shallow dome shape, the upper body section 50 providing an aesthetically satisfactory shape to the upper part of the unit, and also co-operating to locate and support the filter 13.

The unit 10 includes a discharge 60 including a discharge path 61 for air being forced outwardly by the impeller 19 of the fan 12, the discharge path 61 being defined between parts of the body 11, particularly between the lower body section 25 and upper parts of the body (including the mounting plate 16 and upper body section 50). In particular, the body 11 includes flow deflecting means 62 to deflect the air flowing outwardly from the fan 12 in an upwards direction as shown by the arrows B in FIG. 1.

In the illustrated embodiment, the filter 13 is cylindrical and surrounds the impeller 19 and is spaced a short distance from the impeller 19 so the discharged air passes the spacer brackets 29, 30. The diameter of the cylindrical filter 13 and its height are such that the effective area of the filter is quite substantial and bigger than the area of the intake opening so that a longer filter life can be achieved. The filter 13 may comprise two layers of filter media, e.g. an inner layer 63 of 90 pascal gel or oil coated polyester filter medium (filtering particles down to say 0.1 micron) and an outer layer 64 such as a 4 mm thick activated carbon impregnated filter medium to deodorise the air.

The filter 13 is located between a wire support or "basket" 65 mounted for example to the upper body section 50 so that, as shown in FIG. 5, lifting of the upper body section enables ready access to the filter 13 for removal and replacement. In particular, in the embodiment of FIG. 5, the filter 13 can be provided as an elongated strip which is wrapped around the wire basket 65 and the two ends fastened together by co-operating fastener strips 66.

When installed, surrounding the filter 13 is a grill 68 which may be a perforated metal grill or an expanded metal grill. As with the intake grill 28, the grill 68 preferably has a void area of about 65% or greater, e.g. about 68%. The air after having been filtered and purified passes through the grill 68 and out through the discharge path 61 where the air is deflected upwardly to emerge from the body 11 at an angle of about or less than 45° to the vertical.

The flow deflecting means 62 in the illustrated embodiment is principally defined by the smoothly curved surface 70 of the lower body section 25. The curved surface 70 commences at an inner shoulder 71 where the grill 68 is mounted and extends radially outwardly and curves smoothly upwardly to the point 72 where the air emerges from the body 11. The area of the generally annular opening 73 is approximately equal to, but may be substantially greater than, the area of the intake opening 26 so that the air being propelled out through the opening 73 does not have a significantly greater, and possibly has a substantially lower, velocity than the air entering the intake 17. This means that the discharge air flow does not create a draw which can substantially interfere with the drawing effect of the intake, particularly in the target zone 80 (FIG. 3) from which it is desired to effectively draw room air into the unit. In the particular illustrated embodiment, the area of the opening 73 where purified air emerges from (lie body II into the ambient air is approximately 10% less than the area of the intake opening 26, but this does not create a significantly higher velocity of discharge air and consequent draw which can lead to the bypass effect described earlier.

As described above, in the case of a pendant unit mounted by a suspension rod 49 (or multiple suspension rods as shown in FIG. 5), the filter can be replaced by sliding upwardly the upper body section 50, together with the filter support 65. In the case of a unit mounted as a standard or desk lamp as shown in FIG. 1, the upper body section 50 and filter support 65 can be completely separated from the lower body section 25 by lifting. In this FIG. 1 embodiment, the filter 13 can be manufactured as a cylindrical collar without an interruption of the kind provided by the filter in FIG. 5. The cylindrical filter in this case can be slid off the filter support 65 and a replacement cylindrical filter fitted, after which the upper body section 50 is mounted in position with the filter 13 relatively closely contained within the cylindrical grill 68.

Although the filter 13 is preferably cylindrical and is located and mounted as shown in the illustrated embodiments, the filter may instead be generally annular and extend for example across the opening 73 where the air emerges from the body 11 into the ambient surroundings.

The body 11, particularly the lower body section 25 in the illustrated embodiment, has a peripheral extension 75 projecting radially out beyond the discharge 60. The extension 75 is defined by a skirt 76 which can generally follow the contour of the upper body section 50 for aesthetic purposes. The skirt 76 helps to define the enclosed area between the lower body section 25 and the cover 40 where the light source 14 is mounted. The skirt 76 effectively substantially extends the distance that air would need to flow from the discharge opening 73 in order to reach the intake 17. This has been found by the inventors to be particularly advantageous to eliminate or substantially reduce any short circuiting flow from the discharge back to the intake which would reduce the effectiveness of extraction of air from the target zone 80 and hence the effectiveness of circulating room air through the unit to purify that air.

The embodiment of the combined light source/air purifier unit illustrated in the drawings provides a particularly effective unit, including a balance of the conflicting requirements of quiet operation and effective drawing of air from a substantial sized area. The prototype according to the preferred embodiment with the fan running at about 1450 rpm achieved air intake speeds in excess of 2 meters per second and a calculated air flow of over 200 cubic meters per hour. The centrifugal fan with central downwardly facing intake, a light source radially outside the intake, a circumferential filter and a discharge path which includes means to deflect the flow upwardly in combination achieve the effective draw from a large target zone or area coupled with acceptably quiet operation. The effective draw from the target zone is enhanced by using a centrifugal fan with rearward facing blades but, contrary to normal operating specifications for such centrifugal fans, we desirably drive the fan at relatively low speed to achieve quieter operation which is a desirable characteristic for such units. The fan may have multiple possible speeds, such as 3 speeds and, although the lowest speed is generally desirable to minimise noise, the higher speeds may be useable to achieve greater extraction and the consequent greater noise may be acceptable, e.g. at a social gathering, in a busy restaurant or hotel foyer, etc. To minimise the performance degrading effect of short circuiting flow from the discharge to the intake, we preferably provide in the combination a peripheral extension of the body projecting radially outwardly beyond the discharge so as to increase the distance from the discharge to the intake. To minimise or at least reduce the performance degrading effect of bypass, i.e. a substantial draw of ambient air, particularly from the target zone, by the flow emerging from the discharge, we preferably direct the discharge air stream upwardly at about 45°, or at less than 45° to the vertical. Also to help minimise the performance degrading bypass effect, the area of the discharge opening is preferably generally about equal to the area of the intake of the fan, or possibly greater than the area of the intake.

The inventors' extensive testing of different configurations and arrangements of axial and centrifugal fans has established that the particular preferred embodiment illustrated and described herein is particularly effective to achieve the objects of the invention. Some of the elements of the combination provided an unexpectedly superior performance, such as the use of centrifugal fan with rearward facing blades run at a relatively low speed, and it is only the retrospective analyses that have clarified why the superior results have apparently been achieved.

It is to be understood that various alterations, modifications and/or additions may be made to the features of the possible and preferred embodiment(s) of the invention as herein described without departing from the scope of the invention as defined in the claims.

What is claimed is:

1. A combined light source and air purifier unit including: a body (11); a centrifugal fan (12) mounted by the body and having an axis which is upright, the centrifugal fan having a central intake (17) through which air containing contaminants can be drawn from below the unit from a target zone (80) directly below the intake and extending outwardly by a substantial distance; a light source (14) mounted by the body, the light source being located radially outside the intake (17) of the centrifugal fan (12) so as not to obstruct the flow of air being drawn in use into the intake; a filter (13) extending circumferentially so that air passing through the fan (12) and being propelled away by the fan passes through the filter so that contaminants are removed by the filter; and an air discharge (60) including a discharge path (61) for air being propelled by the fan, the discharge including flow deflecting means (62) provided by the body (11) to deflect air flowing outwardly from the fan in an upwards direction.

2. A unit as claimed in claim 1 wherein the centrifugal fan (12) is provided with an impeller (19) having rearward facing blades (20) which have their outer edges trailing behind their inner edges as the impeller rotates.

3. A unit as claimed in claim 2 wherein the unit is constructed and operated to run the impeller (19) at low speed, in the range 1200–1600 rpm, and preferably at about 1400 to 1500 rpm, said speed being substantially below the fan's design rated speed and capacity for effective air movement but developing sufficient pressure to enable effective draw from the target zone (80) while achieving acceptably quiet operation.

4. A unit as claimed in any one of the preceding claims wherein the filter (14) is generally cylindrical and surrounds the centrifugal fan (12) so that air impelled radially outwardly by the fan passes through the filter material and then into the discharge path (61) including the flow deflecting means (61) provided by the body.

5. A unit as claimed in claim 4 wherein the material of which the filter (14) is composed comprises two types of filter material, a first material (63) being operative to separate particulate materials and a second material (64) operative to deodorise.

6. A unit as claimed in claim 5 wherein the first cylindrical filter material (63) encountered by the air is a gel or oil coated filter medium operative or rated to filter particles down to about 0.1 microns.

7. A unit as claimed in claim 6 wherein the second filter material (64) comprises and activated carbon impregnated filter medium operative to deodorise the air.

8. A unit as claimed in claim 1 wherein the air discharged from the unit is directed upwardly at an angel of about 45° or less to the vertical.

9. A unit as claimed in claim 1 wherein the discharge (60) includes a discharge opening (73) having an area about equal to or greater than the area of the intake (17) of the centrifugal fan (12), whereby the velocity of the discharged air is not significantly greater or is lower than the velocity of the air entering the intake with the result that the discharge air stream does not have a significant drawing effect.

10. A unit as claimed in claim 1 wherein the discharge (60) includes a generally annular upwardly facing opening (73) provided in the body (11), the flow deflecting means (62) provided by the body comprising a passage into which air expelled by the centrifugal fan enters, the passage having walls (70) bending in an upwards direction to deflect the air upwardly through the discharge opening.

11. A unit as claimed in claim 10 wherein the passage is defined by a section (25) of the body circumferentially surrounding the fan and provides throughout its circumference a smoothly curved surface (70) which commences at and extends radially out from the centrifugal fan (12) then curves smoothly upwardly to the discharge opening (73).

12. A unit as claimed in claim 1 wherein the body has a peripheral extension (75) projecting radially beyond the discharge (60) so as to increase the distance that air being discharged would need to flow in order to reach the intake (17) of the fan (12).

13. A unit as claimed in claim 12 wherein the peripheral extension (75) provides an available space where the light source (14) is located so as not to obstruct air flow into the intake (17).

* * * * *